Oct. 22, 1974  W. B. JESSUP  3,843,429
GLASS FIBER REINFORCED RESIN TANK STRUCTURES
AND METHOD OF FABRICATING
Original Filed Sept. 18, 1970 3 Sheets-Sheet 1
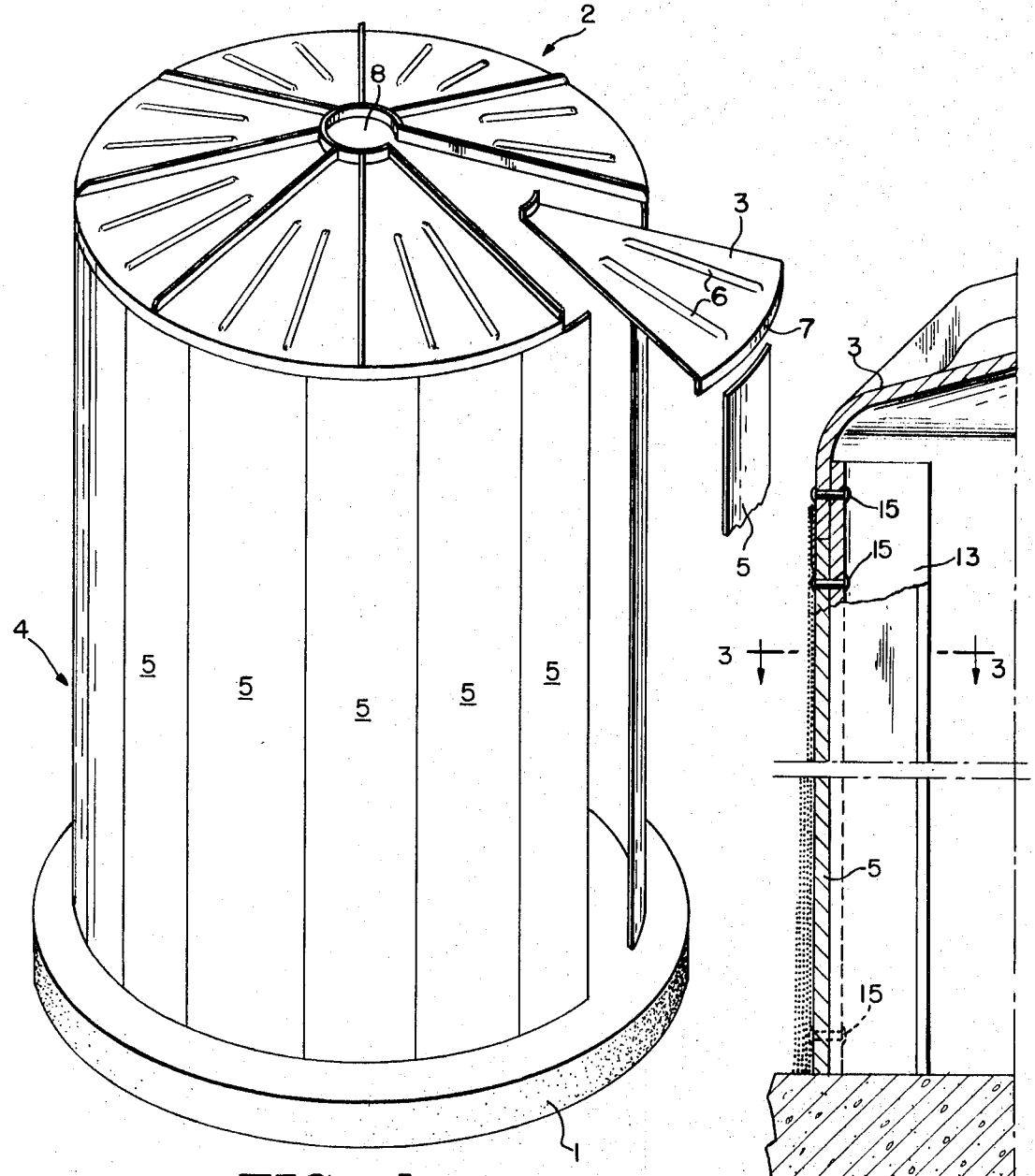
FIG-1
FIG-2
FIG-3
WALLACE B. JESSUP
INVENTOR.
BY
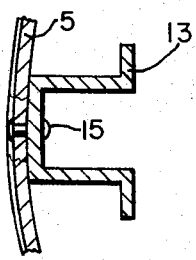
ATTORNEYS

WALLACE B. JESSUP
INVENTOR.

BY
Seed, Berry & Dowrey
ATTORNEYS

Oct. 22, 1974 W. B. JESSUP 3,843,429
GLASS FIBER REINFORCED RESIN TANK STRUCTURES
AND METHOD OF FABRICATING
Original Filed Sept. 18, 1970 3 Sheets-Sheet 3

WALLACE B. JESSUP
INVENTOR.

BY Seed, Berry & Dowrey

ATTORNEYS

United States Patent Office 3,843,429
Patented Oct. 22, 1974

---

3,843,429
GLASS FIBER REINFORCED RESIN TANK STRUCTURES AND METHOD OF FABRICATING
Wallace B. Jessup, Portland, Oreg., assignor to The Stebbins Engineering and Manufacturing Company, Watertown, N.Y.
Continuation of abandoned application Ser. No. 73,538, Sept. 18, 1970. This application Oct. 2, 1972, Ser. No. 294,362
Int. Cl. B29c 27/28; B65h 81/04
U.S. Cl. 156—69       13 Claims

ABSTRACT OF THE DISCLOSURE

Large tank structures are fabricated on-site of glass fiber reinforced resin. A prefabricated top cover of chopped and woven fiber reinforced resin of predetermined circumference is hoisted up a distance equal to at least the height of the tank. Temporary support beams of chopped fiber reinforced resin, metal, wood or other suitable material are secured in vertical position to a base support for the tank at regularly spaced intervals around the designated circumferential area of the tank. Structural, prefabricated, arcuate liner panels of chopped and/or woven fiber reinforced resin are then secured temporarily to the support beams, the liner panels abutting one another and extending between the beams to define the side walls of the tank structure. The edges of the top cover are rested on the top edges of the side walls panels. The joints between the abutting panels and between the top edges of the panels and the lower, outer edges of the top cover are welded together by applying a mixture of chopped and/or woven fiber and resin over the joint areas. The side wall of the tank comprising the arcuate panels is then wound with continuous glass or other fibers impregnated with resin. The winding pattern is helical and spirals both upward and downward to provide adequate hoop strength for the structure. The wound layers may be successive in nature or alternated with chopped and/or woven fiber for added stiffness and longitudinal strength. After curing of the resin-fiber composite, the temporary internal support beams are removed and the inner seams of the arcuate panels sealed with a composite of fiber and resin. The bottom of the tank is formed and joined to the side wall using a resin-fiber composite with the tank base support acting as a form for the bottom material. Prefabricated fittings and appurtenances are installed and welded into the tank structure with a resin-fiber mixture.

---

This is a continuation of application Ser. No. 73,538, filed Sept. 18, 1970, now abandoned.

BACKGROUND OF THE INVENTION

Field of the Invention

This invention relates to fiber reinforced tank structures and to a method of fabricating such.

Prior Art Relating to the Disclosure

On-site fabrication of fiber reinforced resin tanks has been accomplished by filament winding segments of the tank either off-site or on-site and bonding the segments together at the use site. Other means of fabricating fiber resin reinforced tanks are disclosed in U.S. Pat. Nos. 2,729,268 to Broughton et al. and 3,470,656 to Clements. The method of fabrication described by both of the above mentioned patents employs internal mandrels over which the reinforcing fibers wetted with resin are wound. After curing of the resin the inner mandrels are removed. Contrary to the method of fabrication disclosed in the patents, the tank structure of this invention employs structural, arcuate liner panels over which resin impregnated fiber filaments are applied in successive layers. The liner panels are an integral part of the tank structure in that they furnish structural support for the tank and provide a sealer for the contents of the tank.

BRIEF DESCRIPTION OF THE DRAWINGS

FIG. 1 is a perspective view of a tank structure of this invention prior to circumferential winding of the side walls with successive layers of continuous resin-impregnated fiber or alternating layers of chopped fiber-resin and continuous resin-impregnated fiber;

FIG. 2 is a cross sectional view of the tank structure of FIG. 1 showing the tapered outer side walls made up of successive convolutions of cured resin-impregnated fiber;

FIG. 3 is a sectional view along section line 3—3 of FIG. 2 illustrating the configuration of the temporary support beams and their manner of attachment to the arcuate liner panels;

DETAILED DESCRIPTION OF THE INVENTION

Figure 4:
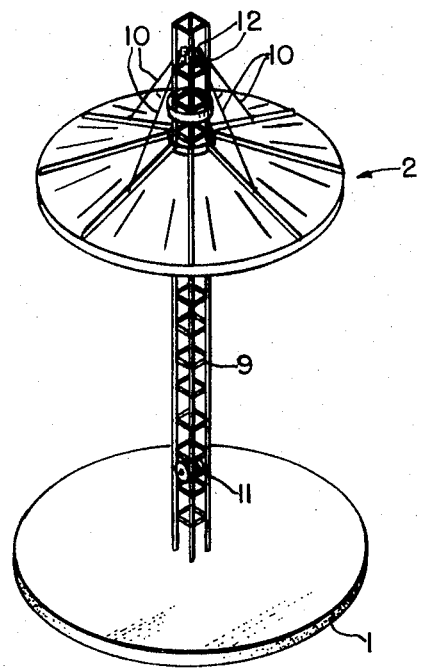
FIGS. 4 to 7 illustrate steps employed in the method of fabricating the tank structures of this invention.

Large tank structures of glass fiber reinforced resin are useful because of their corrosion resistance. Fabrication of large tanks has been quite expensive by prior art methods because of the amount of hand labor required and the elaborate internal mandrels used. The tank structure of this invention can be fabricated on-site with ease, employing a minimum of hand labor and making efficient use of temporary structural supports.

For on-site fabrication a support slab 1 of concrete or other suitable material is provided for erection of the tank thereon.

The finished tank of this invention may be an open top tank or a closed top tank. If a top cover is desired, the cover may be fabricated from a series of pie-shaped sections bonded together by applying a mixture of chopped and woven glass fiber and uncured resin over the joints between the sections.

The side walls of the tank of this invention have an inner surface formed by a series of arcuate, structural liner panels abutting each other and defining the circumference of the tank. Both the top cover sections and the liner panel sections may be prefabricated either on-site or off-site to the size desired. FIG. 1 illustrates the tank, prior to filament winding of the side wall. The top cover 2 is formed of a series of pie-shaped sections 3 and the side walls 4 of a series of arcuate panel sections 5. The pie-shaped sections 3 have ribbed portions 6 integral therewith for reinforcement. At the outer end of each of the pie-shaped sections is a downwardly extending flange 7. In the center of the top cover is an opening 8. Each of the pie-shaped sections is formed, preferably of chopped fiber and resin sprayed over a mold or form. Sufficient material is sprayed over the mold to form sections of desired thickness.

The liner panels 5 provide longitudinal strength for the structure and are fabricated by applying a mixture of resin and chopped fiber onto an arcuate form, the arc corresponding to that required for the diameter tank being built. The height of the panels is substantially equal to the height of the tank with the thickness of the panels adequate to meet the design requirements. A preferred way of forming the arcuate panels is to provide a horizontal form or mold having the requisite arc over which is sprayed a mixture of resin and chopped fiber, the spraying head being mounted for both longitudinal and lateral movement over the mold or forming surface. By mechanical, hydraulic or electrical programming the spraying head is controlled in its longitudinal and lateral movements to produce panels of uniform thickness and quality. Preferably the longitudinal edges of each of the panels is bevelled so that, when the abutting edges of the panels are joined by application of fiber-resin composite over the joint areas, the outer surface of the side walls is uniform.

Figure 5:
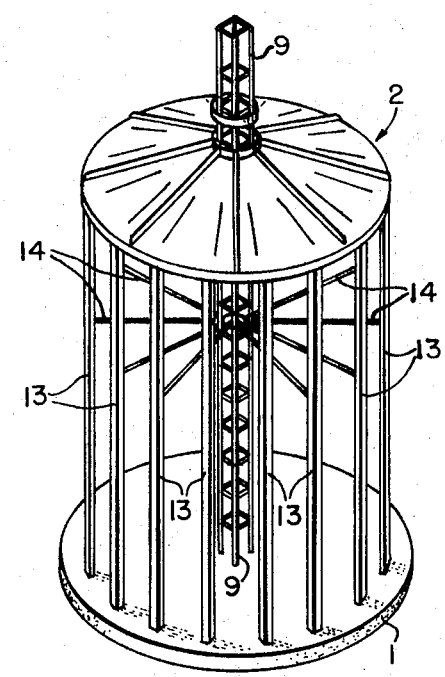
Figure 7:
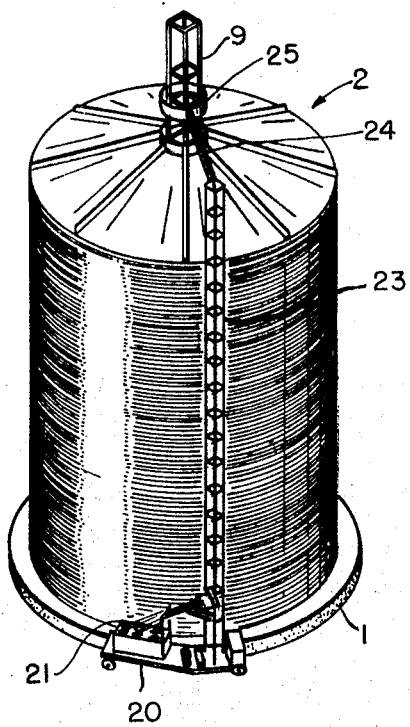
Figure 6:
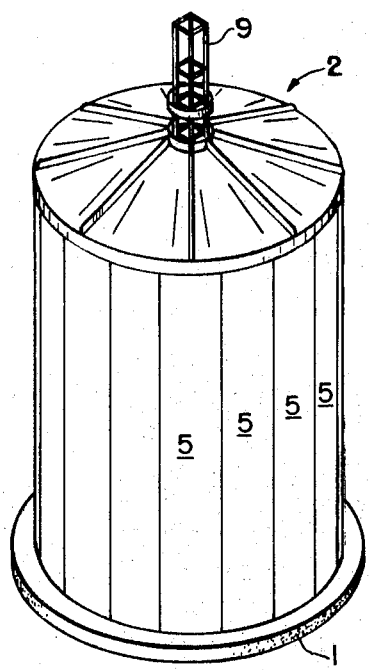

FIGS. 4 to 6 illustrate steps in the fabrication of a tank structure.

Referring to FIG. 4 a mast 9 is erected, generally in the center of the circumferential area to be occupied by the tank, the mast being high enough to extend above the top of the tank a predetermined distance. The mast is used for several purposes: (1) to support the top cover section initially while the support beams are being fitted into place, (2) for erection of lateral arms extending outwardly therefrom to aid the support beams in supporting the side walls during filament winding thereof, and (3) to support a cover or housing for the entire tank structure to shield it against weather conditions during fabrication.

The top cover may be fabricated on the support slab 1 around mast 9 by welding prefabricated pie-shaped sections 3 together. After the welded joints have sufficiently cured guy wires 10 extending upwardly through the mast from a winding spool 11 and over idler rolls 12 are attached to the top cover 2 at predetermined points. The top cover 2 is then hoisted upwardly manually or by power means to the position shown in FIG. 4. Structural support beams 13 are then erected as shown in FIG. 5. These may be of wood, steel or other suitable material. For example, they may be fabricated from chopped fiber and resin by forming them over a mandrel in a conventional manner. The support beams 13 are fastened or secured to the support slab 1 at spaced intervals around the circumference to be occupied by the tank by any suitable means such as rivets, bolts, etc. The upper ends of each of the beams extend under the top cover 2 inside of the flange 7 on each of the pie-shaped sections 3.

If a tank twenty or more feet in height is being fabricated it is desirable to provide laterally extending arms 14 (see FIG. 5) part way up mast 9. The arms extend between mast 9 and support beams 13 and aid in keeping the beams in alignment during filament winding of the outer surface of the side walls. If a tank of less than ten feet in height is fabricated the arms are not generally necessary.

The arcuate liner panels are secured by rivets 15 (see FIG. 2) or other suitable means to beams 13, the panels abutting each other along their side edges and extending between the support beams. The top edges of the liner panels abut the lower edges of flange 6 of the pie-shaped sections 3, making up the top cover 2 as shown in FIG. 2. The joints between each of the abutting panels 5 and the joints between the upper edges of panels 5 and the lower edges of flanges 6 of the top cover are welded together prior to filament winding of the side walls of the tank with a mixture of chopped fiber and resin applied over the joints, thereby providing a tank structure having an inner liquid seal. The joints are usually sealed by applying resin-impregnated chopped glass rovings with a conventional spray gun. Joint areas may also be sealed manually if desired.

Figure 8:
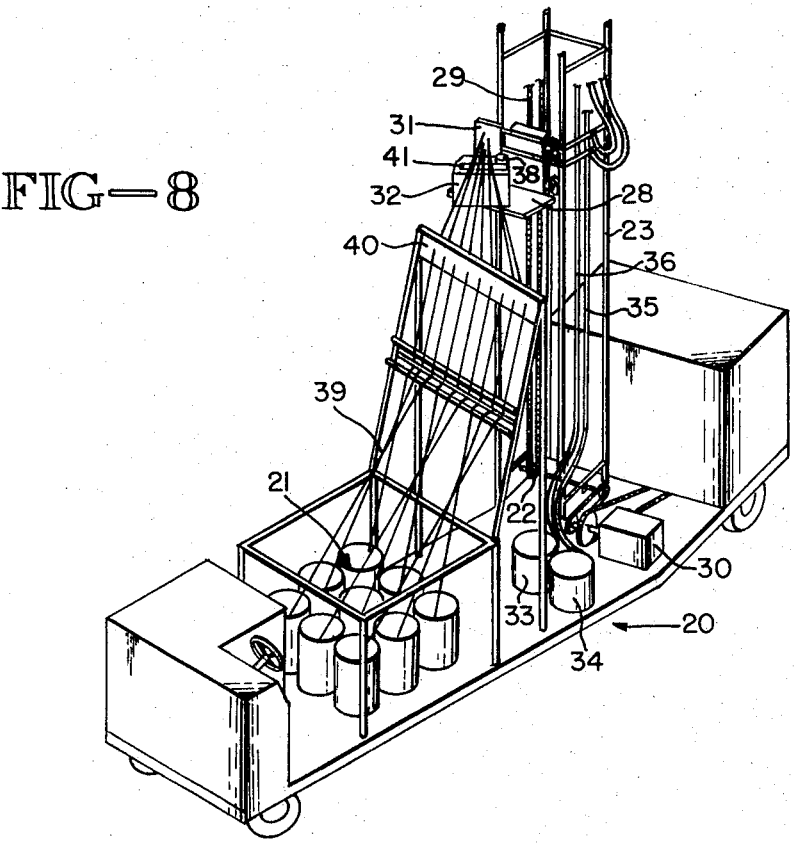
FIG. 8 is an isometric view of the winding machine used to lay successive or alternating layers of continuous resin-impregnated filaments over the arcuate panels forming the side walls of the tank structure.
Figure 9:
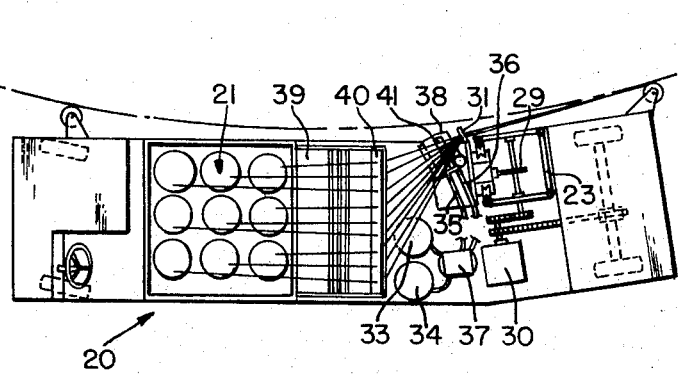
FIG. 9 is a plan view of the winding machine of FIG. 8.
Figure 10:
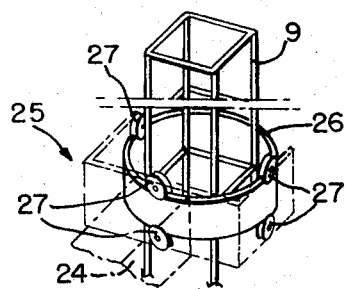
FIG. 10 is a partial isometric view of the means for securing the upper portion of the tower of the winding machine to the mast extending through the top of the tank structure.

To wind the side walls with continuous resin-impregnated glass fiber a wheeled carriage 20 is provided, the carriage supporting a filament supply comprising a plurality of sources 21 of glass rovings or filaments. Secured to the wheeled carriage 20 is an elevated mast 23 extending the height of the tank or higher. The mast 23 is supported at its upper end with a support arm 24 extending horizontally out from a rotating joint 25 positioned on the support mast 9. The rotating joint includes a cylindrical track 26 surrounding mast 9 and attached thereto by means of suitable brackets. Support arm 24 includes a U-bracket at one end on which are attached sets of rollers 27, each set of rollers positioned to contact the upper and lower track surfaces of track 26. A platform 28 is mounted for travel up and down mast 23 along tracks defined by two of the vertical supports of mast 23. The platform is secured to chain 29, trained around rotatable sprockets at the upper and lower ends of the mast 23. Only the lower sprocket 22 is shown in FIG. 8. Chain 29 and the platform 28 are driven by rotation of the wheels of the carriage through suitable gear reduction means 30. A layup arm 31 is secured to the platform 28 and moves therewith. The carriage 20 contains suitable power means for driving the wheels thereof. The layup arm 31 travels up and down the mast 23 a predetermined amount per rotation of the carriage around the tank. The ratio of upward travel of the layup arm per revolution of the carriage around the tank is adjustable. Generally, the ratio of upward travel of the layup arm per revolution of the carriage is about equal to the width of the resin-impregnated glass fiber layed down.

Winding machines of the prior art have provided a resin bath and means for wiping excess resin from the filaments passed through the resin bath immediately adjacent the fiber supply. The resin-impregnated filaments must then travel to the point of layup, which, at times, may be a height of 30 feet or more. Curing of the resin begins during such an extended length of travel with the result that the physical properties of the filament wound tank are not optimum. To prevent this, the resin bath 32 of the winding machine of this invention is located adjacent the layup arm on platform 28 and travels up and down the mast 23 with the layup arm. Resin and a catalyst for the resin are stored in separate containers 33 and 34 on the carriage and separate feed lines 35 and 36 provided from each of the containers to carry the resin and catalyst from the containers to suitable metering pumps 37 which meter predetermined quantities of resin and catalyst through the separate feed lines to the resin bath adjacent the layup arm 31. The resin and catalyst are mixed together with a suitable mixer 38 just before entry into the resin bath. The glass fiber rovings 39, pulled from filament supply 21, pass upwardly through guides 40 and, just prior to layup, pass over a metering roll 41 mounted in the resin bath 32 which picks up freshly mixed resin and deposits it uniformly onto the glass filaments. Wiping orifices may be provided to remove excess resin from the filaments as they exit from the resin bath. The continuous resin-impregnated glass fiber rovings are wound in a generally helical formation and extend spirally both upwardly and downwardly. It is desirable to taper the outer wall as shown in FIG. 2, the filament windings being thicker in cross-section at the lower end than at the top. This provides greater hoop strength for the tank at the lower end.

After the resin has cured sufficiently, access openings are cut in the tank where desired. The temporary rivets 15 holding the beams 13 to the arcuate liner panels 5 are removed and the temporary beams 13 removed through the top or side openings. Nozzles, fittings, and appurtenances may be installed in the tank using chopped and woven glass fiber reinforced resin. A colored coating may be applied after installation of exterior nozzles, fittings, and appurtenances. The tent cover and the center support mast 9 are then removed.

An integral bottom is installed in the tank by spraying resin-impregnated chopped fiber onto the tank support base and up onto the tank side wall, the side wall and tank support base acting as a mold for the resin-glass mixture. The interior seams of the arcuate panels are sealed with a mixture of chopped glass fiber and resin applied by hand or with a spray gun. If a cover is not required on the tank a pre-molded fiber reinforced resin ring structure (not shown) is substituted in place of the cover to hold the upper ends of the arcuate panels in proper alignment. This ring structure may be fabricated of any suitable material.

By the means described a tank of large capacity can be fabricated on-site with a minimum of hand labor, a minimum of structural necessities and a minimum number of machine fabrication facilities.

The embodiments of the invention in which an exclusive property or privilege is claimed are defined as follows:

1. A method of on-site fabrication of glass fiber, reinforced, plastic-resin tank structures, using a plurality of pre-fabricated, structural, arcuate liner panels of glass fiber, reinforced resin, comprising:

providing a base support for the tank structure, temporarily securing vertical support and alignment beams to the base support at spaced intervals corresponding to the width of the liner panels to define the circumference of the tank structure, the beams extending the height of the tank structure, providing a central beam extending upwardly from the base support having a plurality of lateral arms extending therefrom into contact with the temporary vertical support beams to support the side walls of the structure during fabrication thereof, temporarily securing by removable rivets the liner panels to the vertical support and alignment beams, the panels extending the height of the beams and abutting each other along their side edges in coincidence with the vertical support beams to define the side walls of the tank structure, providing a top cover for the tank structure of glass fiber, reinforced resin, securing the top cover to the top edges of the liner panels, applying a mixture of chopped glass fiber and resin over the joint areas between the abutting liner panels and between the top cover and the top edges of the liner panels to seal them and form an integral tank structure, mixing resin and catalyst together for impregnation of continuous glass fiber roving for winding of the side walls of the tank structure closely adjacent the point of application of the resin-impregnated glass fiber to the side walls, impregnating the glass fiber roving with the resin-catalyst mixture, winding successive layers of the resin-impregnated continuous glass fiber roving around the outer surfaces of the liner panels in a helical pattern extending spirally both upward and downward to provide hoop strength for the tank structure, removing the support and alignment beams temporarily secured to the liner panels from the interior of the tank structure after curing of the resin, and applying resin-impregnated chopped glass fiber over the inner portion of the base support surrounded by the liner panels and joint areas between the lower ends of the liner panels in the base support to form an integral bottom wall for the tank structure.

2. A method for fabricating a tank structure on site by integrally binding together a plurality of pre-formed interior liner panels temporarily held in position by a plurality of elongated alignment beams, comprising the steps of (a) providing a base support for the tank structure;

(b) forming an alignment structure by securing the elongated alignment beams to the base support in a generally vertical orientation at spaced intervals about the periphery of the desired tank configuration such that the spaced intervals correspond to the width of the pre-formed liner panels;

(c) placing the pre-formed liner panels in vertical edge abutting relationship about the periphery of the alignment structure such that the abutting vertical edges coincide with the position of the elongated alignment beams;

(d) securing temporarily the pre-formed liner panels to the elongated alignment beams;

(e) binding the pre-formed liner panels together by wrapping the outside surface of the panels with a sufficient number of turns of a filament coated with uncured resin to provide the desired degree of hoop strength to the tank;

(f) bonding the pre-formed tank sections permanently together by curing the resin; and (g) removing the elongated alignment beams.

3. The method as defined in claim 2, wherein step (b) includes the step of securing the alignment beams in such a way as to define a cylindrical tank configuration and step (c) includes the step of placing pre-formed liner panels over the entire height of the cylindrical surface defined by the alignment beams.

4. The method as defined in claim 2, further including the step of sealing the joints between the pre-formed liner panels prior to step (e).

5. The method as defined in claim 2, wherein step (e) includes the steps of wrapping the outside surface of the panels with glass fiber rovings and coating the glass fiber rovings with a mixture of resin and catalyst closely adjacent the point of application of the glass fiber rovings to the pre-formed liner panels.

6. The method as defined in claim 5, wherein step (e) further includes the step of winding successive layers of resin coated glass fiber rovings around the outer surfaces of the pre-formed liner panels in a helical pattern extending spirally both upwardly and downwardly of the tank structure.

7. The method as defined in claim 2, wherein step (b) further includes the steps of (1) erecting a temporary vertically extending mast with the base thereof being secured to the base support of the tank at the center point of the desired tank base configuration, (2) forming a top cover about the vertically extending mast adjacent the base support of the tank, (3) lifting the top cover to a position in which the top cover is to reside when the tank structure is completed.

8. The method as defined in claim 7, wherein step (b) further includes the step of securing temporarily the alignment beams to the top cover.

9. The method as defined in claim 8 further including the step of sealing the joints between the pre-formed liner panels and the joints between the pre-formed liner panels and the top cover prior to step (e).

10. The method as defined in claim 7, wherein step (2) further includes the step of forming the top cover out of a plurality of pie-shaped segments truncated at the inner end to form an opening through which the vertically extending mast may pass.

11. The method as defined in claim 7, wherein step (2) further includes the step of providing a plurality of lateral arms connected at one end with the vertically extending mast and connected at the other end with one of the alignment beams, respectively, to support the side walls of the tank structure during filament winding thereof.

12. The method as defined in claim 2, further including the step of applying resin-impregnated chopped fiber over the inner portion of the base support surrounded by the pre-formed liner panels and the joint areas between the lower ends of the liner panels and the base support to form an integral bottom wall for the tank structure prior to removal of the temporary alignment beams.

13. The method as defined in claim 2, wherein step (d) includes temporarily securing the alignment beams to the pre-formed liner panels by removable rivets.

References Cited
UNITED STATES PATENTS

| | | | |
|---|---|---|---|
| 3,524,780 | 8/1970 | Clements | 156—191 |
| 3,562,047 | 2/1971 | Carlini | 156—184 |
| 3,074,585 | 1/1963 | Koontz | 220—3 |
| 3,412,891 | 11/1968 | Bastone et al. | 220—83 |
| 3,423,264 | 1/1969 | Miron et al. | 156—71 |
| 3,086,753 | 4/1963 | Cushman | 254—93 |
| 3,626,836 | 12/1971 | Schneider | 98—33 |
| 3,637,446 | 1/1972 | Elliott et al. | 156—69 |
| 3,461,009 | 8/1969 | Snyder et al. | 156—69 |
| 2,729,268 | 1/1956 | Broughton et al. | 156—425 |
| 2,808,097 | 10/1957 | Martin | 156—425 |

DANIEL J. FRITSCH, Primary Examiner

U.S. Cl. X.R.

156—172, 425